(12) United States Patent
Baird

(10) Patent No.: US 6,467,343 B1
(45) Date of Patent: Oct. 22, 2002

(54) LIQUID LEVEL GAUGE

(76) Inventor: James Baird, 17801 Willow Creek Rd., Occidental, CA (US) 95465

( * ) Notice: Subject to any disclaimer, the term of this patent is extended or adjusted under 35 U.S.C. 154(b) by 0 days.

(21) Appl. No.: 09/873,151

(22) Filed: Jun. 1, 2001

(51) Int. Cl.[7] .............................................. G01F 23/02
(52) U.S. Cl. ...................................... 73/323; 73/290 R
(58) Field of Search .............................. 73/323, 290 R, 73/325, 334

(56) References Cited

U.S. PATENT DOCUMENTS

| 190,607 A | 5/1877 | McInnes | |
|---|---|---|---|
| 813,096 A | 2/1906 | House | |
| 2,696,738 A | * 12/1954 | Lupfer | ......................... 73/299 |
| 5,052,224 A | * 10/1991 | Ford et al. | ..................... 73/325 |
| 5,272,918 A | * 12/1993 | Gaston et al. | ............ 73/290 R |
| 5,484,336 A | * 1/1996 | McConnell | .................. 460/119 |

* cited by examiner

Primary Examiner—Hezron Williams
Assistant Examiner—Rodney Frank
(74) Attorney, Agent, or Firm—Jack Lo

(57) ABSTRACT

The present liquid level gauge for a liquid holding tank is comprised of a first tube with an inner section positioned inside the tank, and an outer section positioned vertically outside the tank. A larger diameter transparent tube is positioned around the outer section of the first tube, and has a sealed lower end. The outer end of the first tube is open to the interior of the transparent tube. The inner end of the first tube is connected to a bladder positioned at the bottom of the tank. The bladder and the first tube are filled with an indicator fluid. The transparent tube is partially filled with the indicator fluid that flow from the outer end of the first tube. The height of the indicator fluid in the transparent tube is the same as the level of the liquid in the tank.

17 Claims, 3 Drawing Sheets

LIQUID LEVEL GAUGE

BACKGROUND OF THE INVENTION

1. Field of the Invention

This invention relates generally to liquid level indicators.

2. Prior Art

Gauges are commonly used for indicating fill levels in liquid holding tanks. U.S. Pat. No. 5,484,336 to McConnell; U.S. Pat. No. 2,696,738 to Lupfer; and U.S. Pat. No. 190,607 to McInnes each disclose a gauge comprising a fluid reservoir positioned at the bottom of a tank and immersed in a liquid in the tank. The reservoir is connected to a transparent vertical tube extending through the side wall of the tank near the bottom. A fluid in the reservoir is forced up the tube by the hydraulic pressure on the reservoir to indicate the level of the liquid in the tank. However, piercing the tank near its bottom and installing the tube through the aperture requires emptying the tank first. This cannot be done if the gauge has to be retrofitted to the tank because there is usually no place to hold the liquid temporarily outside the tank. The aperture through which the tube is positioned is also susceptible to leakage after installation. U.S. Pat. No. 813,096 to House discloses a gauge comprising a diaphragm at the bottom of a tank. A pipe is connected between the diaphragm and an indicator tube to transmit the air pressure in the diaphragm to a fluid reservoir at the bottom of the indicator tube. A fluid in the reservoir is forced up the tube to indicate the liquid level in the tank. However, air is compressible and thus cannot reliably transmit the pressure from the tank to the reservoir.

OBJECTIVES OF THE INVENTION

The objectives of the present liquid level gauge are:

- to reliably indicate the level of a liquid in a tank;
- to be installable without emptying the tank;
- to avoid the possibility of causing leaks in the tank;
- to be easily readable;
- to remain readable after prolonged exposure to sunlight;
- to prevent buildup of minerals and bacteria;
- to be freeze resistant; and
- to prevent itself from being obscured by any adjacent vegetation.

Further objectives of the present invention will become apparent from a consideration of the drawings and ensuing description.

BRIEF SUMMARY OF THE INVENTION

The present liquid level gauge for a liquid holding tank is comprised of a first tube with an inner section positioned inside the tank, and an outer section positioned vertically outside the tank. A larger diameter transparent tube is positioned around the outer section of the first tube, and has a sealed lower end. The outer end of the first tube is open to the interior of the transparent tube. The inner end of the first tube is connected to a bladder positioned at the bottom of the tank. The bladder and the first tube are filled with an indicator fluid. The transparent tube is partially filled with the indicator fluid that flow from the outer end of the first tube. The height of the indicator fluid in the transparent tube is the same as the level of the liquid in the tank.

DRAWING REFERENCE NUMERALS

| | |
|---|---|
| 10. Liquid Level Gauge | 11. Tank |
| 12. Liquid | 13. First Tube |
| 14. Inner Section | 15. Outer Section |
| 16. Connector | 17. Bladder |
| 18. Housing | 19. Transparent Tube |
| 20. Plug | 21. Bag |
| 22. Splitter | 23. Indicator Fluid |
| 26. Shroud | 27. Scale |
| 28. Hole | 29. Clamp |
| 30. Hatch | 31. First End |
| 32. Second End | 33. Third End |
| 34. Holes | |

DETAILED DESCRIPTION OF THE INVENTION

FIGS. 1–2

Figure 1:
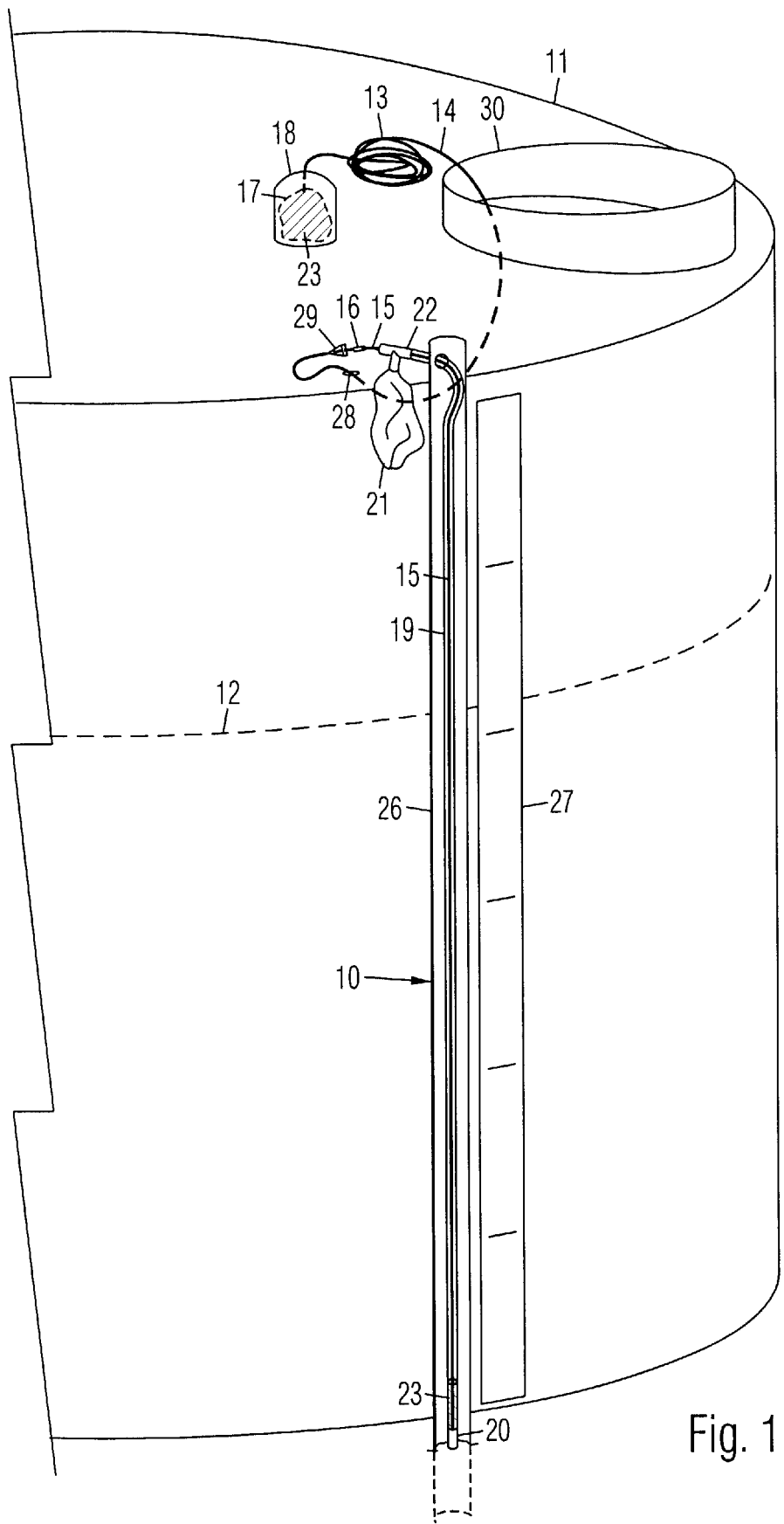
FIG. 1 is a side perspective view of the present liquid level gauge being installed on a tank.

A preferred embodiment of the present liquid level gauge 10 for a conventional tank 11 holding a liquid 12 is shown in a side perspective view in FIG. 1. It is comprised of a first tube 13 which is comprised of an inner section 14 connected to an outer section 15 by a connector 16. First tube 13 is preferably opaque. Inner section 14 and outer section 15 and may be of different diameters. An inner end of inner section 14 is communicably attached to a flexible bladder 17 inside an unsealed protective housing 18. Flexible bladder 17 may be any type of compressible and expandable container. Outer section 15 of first tube 13 is positioned vertically outside tank 11 down to the bottom of tank 11. A larger diameter transparent tube 19 is positioned around outer section 15 of first tube 13, from about the bottom of outer section 15 to above the highest anticipated level of liquid 1 in tank 11. The lower end of transparent tube 19 is sealed, preferably with a plug 20. A bag 21 is communicably connected to the upper end of transparent tube 19, preferably with a splitter 22. Bag 21 may be any type of compressible and expandable container. The upper end of transparent tube 19 is sealed around first tube 13, preferably by splitter 22.

Bladder 17 is filled with an indicator fluid 23, which preferably has the same specific gravity as liquid 12 inside tank 11, and is of a relatively dark color for visibility, Food color is suitable for dying indicator fluid 23 because it is relatively resistant to fading in direct sunlight. If indicator fluid 23 is subject to cold weather, alcohol such as vodka may be added to indicator fluid 23 to lower the freezing point and inhibit bacteria growth.

An elongated shroud 26 is positioned between transparent tube 19 and tank 11 to help prevent transparent tube 19 from being obscured by any adjacent vegetation. The lower end of shroud 26 may be embedded in the ground for support, or shroud 26 may be attached to the side of tank 11. Shroud 26 is preferably of a light color for contrast with indicator fluid 23. A vertical scale 27 is positioned next to transparent tube 19. Alternatively, shroud 26 may be marked with a scale.

Figure 2:
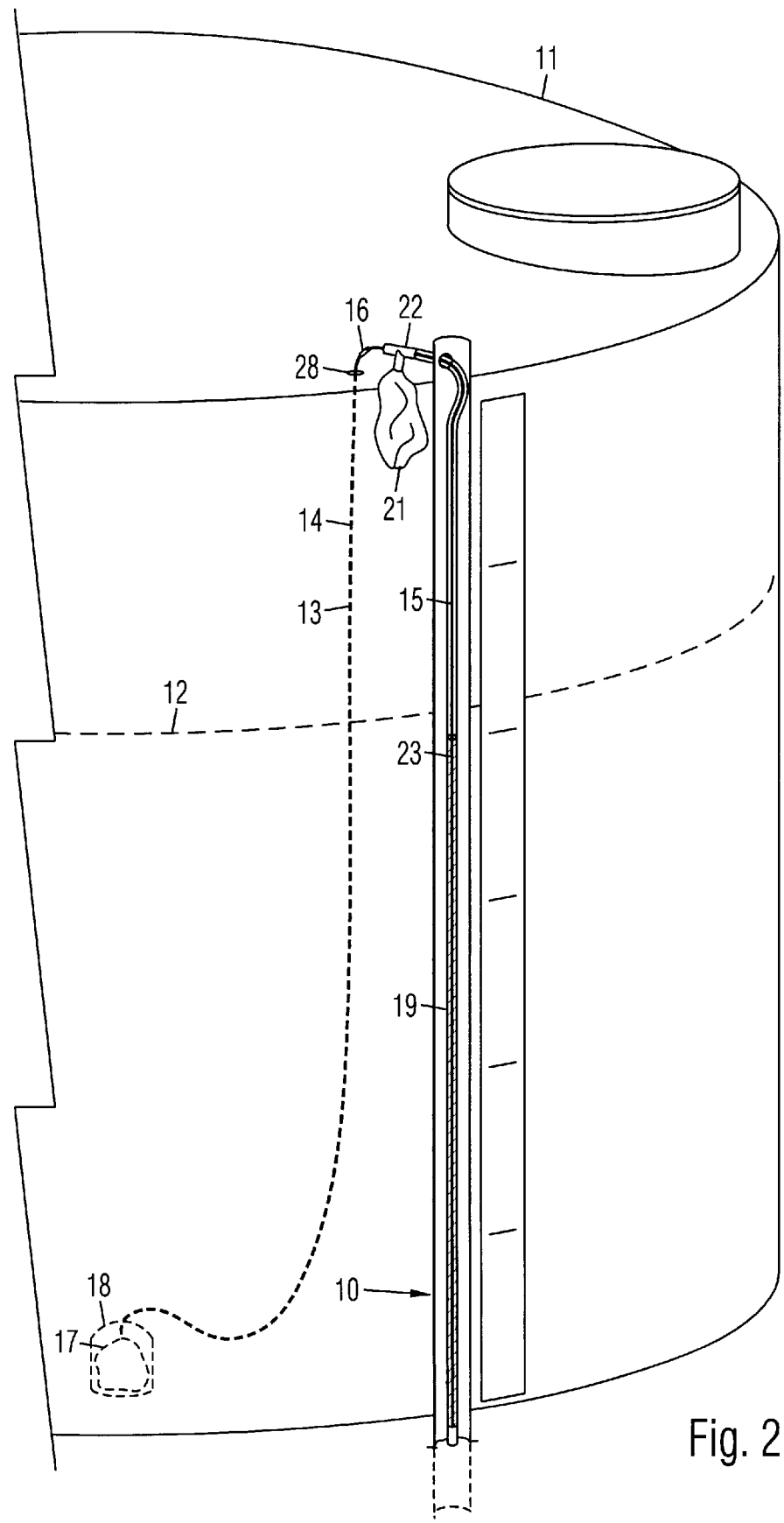
FIG. 2 is a side perspective view thereof fully installed on the tank.

Gauge 10 is installed in tank 11 by drilling a hole 28 near the top of tank 11 above the maximum level of liquid 12, as shown in FIG. 1. Since hole 28 is above the maximum liquid level, the possibility of leakage is eliminated. Hole 28 only needs to be slightly larger than the diameter of first tube 13. Inner section 14 and outer section 15 of first tube 13 are first disconnected. Bladder 17 and inner section 14 of tube 13 are pre-filled with indicator fluid 23, which is prevented from flowing out when inner section 14 is disconnected from outer section 15 by a clamp 29 attached to outer end of inner section 14. The external parts of gauge 10 are assembled and positioned outside tank 11. Bladder 17 and housing 18 are positioned outside tank 11 higher than outer section 15 of first tube 13. Inner section 14 and outer section 15 are connected, and clamp 29 is removed from inner section 14. Indicator fluid 23 is allowed to flow into outer section 15 of first tube 13. As transparent tube 19 is starting to be filled by indicator fluid 23 flowing from the open lower end of outer section 15 of tube 13, bladder 17 and housing 18 are dropped into liquid 12 and allowed to settle to the bottom of tank 11 due to the weight of housing 18, as shown in FIG. 2. Additional indicator fluid 23 is forced into transparent tube 19 by the pressure exerted on bladder 17 in liquid 12, until indicator fluid 23 is even with the height of liquid 12 in tank 11. The height of indicator fluid 23 will automatically rise and fall with the level of liquid 13 in tank 11 to indicate the fill level of tank 11.

FIG. 3

Figure 3:
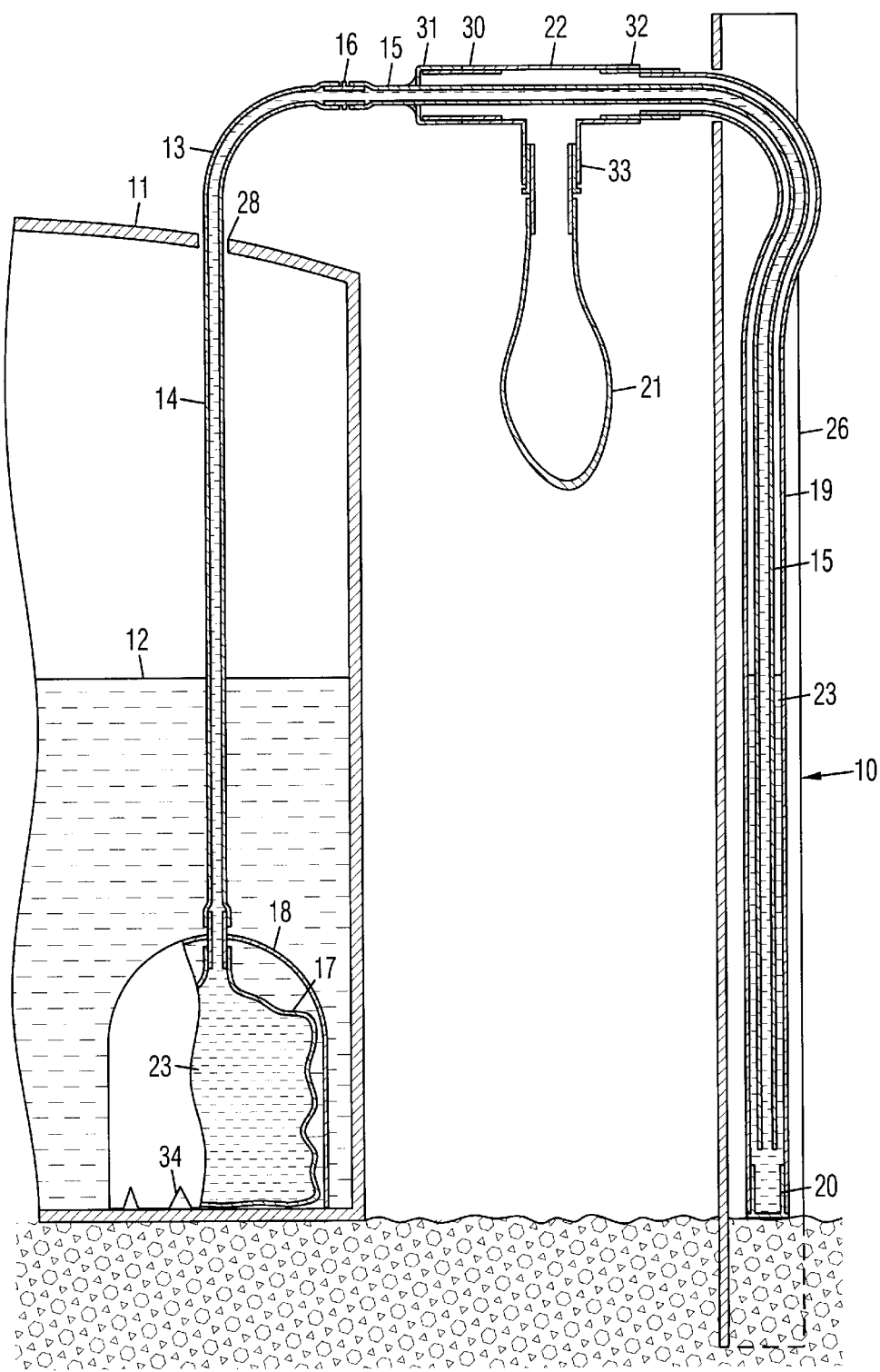
FIG. 3 is a sectional view thereof.

A sectional view of gauge 10 is shown in FIG. 3 enlarged and out of scale for clarity. A first end 30 of splitter 22 is sealed by a pierced cap 31 surrounding first tube 13. A second end 32 of splitter 22 is communicably attached to the upper end of transparent tube 19. A third end 33 of splitter 22 is communicably attached to bag 21. The upper end of transparent tube 19 is closed by splitter 22 and bag 21, whereas the lower end thereof is closed by plug 20. The inner end of first tube 13 is closed by bladder 17, and the outer end is open to the interior of transparent tube 19. Transparent tube 19 is thus sealed to prevent entry of contaminants, and the evaporation of indicator fluid 23. Bag 21 will automatically expand and contract to receive and release the volume of air in transparent tube 19 above indicator fluid 23 as the level of indicator fluid 23 changes with the level of liquid 12 in tank 11. Holes 34 are provided in housing 18 for equalizing the pressure between the inside and outside of housing 18 and allowing bladder 17 to respond to the pressure of liquid 12.

SUMMARY AND SCOPE

Accordingly, the present liquid level gauge reliably indicates the level of a liquid in a tank. It can be installable without emptying the tank. It avoids the possibility of causing leaks in the tank. It is easily readable. It remains readable after prolonged exposure to sunlight. It is freeze resistant. It prevents the buildup of minerals and bacteria. It also prevents itself from being obscured by adjacent vegetation.

Although the foregoing description is specific, it should not be considered as a limitation on the scope of the invention, but only as an example of the preferred embodiment. Many variations are possible within the teachings of the invention. For example, different attachment methods, fasteners, materials, dimensions, etc. can be used unless specifically indicated otherwise. The relative positions of the elements can vary, and the shapes of the elements can vary. Therefore, the scope of the invention should be determined by the appended claims and their legal equivalents, not by the examples given.

I claim:

1. A liquid level gauge for a tank holding a liquid, comprising:

a first tube folded about an intermediate portion to define an inner section and an outer section extending downward from said intermediate portion, wherein said intermediate portion is adapted to be positioned at a top of said tank, said inner section is adapted to be generally positioned in said tank and said outer section is adapted to be generally positioned vertically outside said tank down to about a lower end of said tank;

a flexible bladder attached to an inner end of said inner section of said first tube and adapted to be immersed in said liquid at a bottom of said tank;

a transparent tube communicably connected to a lower end of said outer section of said first tube and extending upwardly toward said intermediate portion of said first tube; and an indicator fluid received in said bladder and said first tube, wherein said indicator fluid is free to flow into the transparent tube from said first tube, said indicator fluid automatically rising in said transparent tube to a level adapted to be about equal to a level of said liquid in said tank.

2. The liquid level gauge of claim 1, wherein said inner section of said first tube is detachably connected to said outer section by a connector for facilitating installation in said tank.

3. The liquid level gauge of claim 1, further including an unsealed protective housing around said bladder, and a hole in said housing for equalizing pressure between an interior and an exterior thereof and subjecting said bladder to pressure from said liquid.

4. The liquid level gauge of claim 1, further including food color blended in said indicator fluid for visibility and resistance to fading in direct sunlight.

5. The liquid level gauge of claim 1, further including alcohol blended in said indicator fluid to lower a freezing point of said indicator fluid and help inhibit bacteria growth.

6. The liquid level gauge of claim 1, further including an elongated shroud positioned behind said transparent tube to help prevent said transparent tube from being obscured by any adjacent vegetation.

7. A liquid level gauge for a tank holding a liquid, comprising:

a first tube folded about an intermediate portion to define an inner section and an outer section extending downward from said intermediate portion, wherein said intermediate portion is adapted to be positioned at a top of said tank, said inner section is adapted to be generally positioned in said tank and said outer section is adapted to be generally positioned vertically outside said tank down to about a lower end of said tank;

a flexible bladder attached to an inner end of said inner section of said first tube and adapted to be immersed in said liquid at a bottom of said tank;

a larger diameter transparent tube concentrically positioned around said outer section of said first tube and extending generally from a lower end of said outer section of said first tube toward said intermediate portion of said first tube, wherein said first tube extends through an upper end of said transparent tube; and an indicator fluid in said bladder and said first tube, wherein a lower end of said outer section of said first tube is open to an interior of said transparent tube and said indicator fluid is free to flow in a gap between said first tube and said transparent tube, said indicator fluid automatically rising in said transparent tube to a level adapted to be about equal to a level of said liquid in said tank.

8. The liquid level gauge of claim 7, wherein said inner section of said first tube is detachably connected to said outer section by a connector for facilitating installation in said tank.

9. The liquid level gauge of claim 7, further including an unsealed protective housing around said bladder, and a hole in said housing for equalizing pressure between an interior and an exterior thereof and subjecting said bladder to pressure from said liquid.

10. The liquid level gauge of claim 7, further including food color blended in said indicator fluid for visibility and resistance to fading in direct sunlight.

11. The liquid level gauge of claim 7, further including alcohol blended in said indicator fluid to lower a freezing point of said indicator fluid and help inhibit bacteria growth.

12. The liquid level gauge of claim 7, further including an elongated shroud positioned behind said transparent tube to help prevent said transparent tube from being obscured by any adjacent vegetation.

13. A liquid level gauge for a tank holding a liquid, comprising:

a first tube folded about an intermediate portion to define an inner section and an outer section extending downward from said intermediate portion, wherein said intermediate portion is adapted to be positioned at a top of said tank, said inner section is adapted to be generally positioned in said tank and said outer section is adapted to be generally positioned vertically outside said tank down to about a lower end of said tank, said inner section and said outer section are detachable from each other for facilitating installation in said tank;

a flexible bladder attached to an inner end of said inner section of said first tube and adapted to be immersed in said liquid at a bottom of said tank;

a larger diameter transparent tube concentrically positioned around said outer section of said first tube and extending generally from a lower end of said outer section of said first tube toward said intermediate portion of said first tube, wherein said first tube extends through an upper end of said transparent tube;

an indicator fluid in said bladder and said first tube, wherein a lower end of said outer section of said first tube is open to an interior of said transparent tube and said indicator fluid is free to flow in a gap between said first tube and said transparent tube, said indicator fluid automatically rising in said transparent tube to a level adapted to be about equal to a level of said liquid in said tank;

a tubular splitter with a first end concentrically sealed around said first tube, and a second end connected to said upper end of said transparent tube; and a flexible bag connected to a third end of said splitter, said bag automatically expanding and contracting to receive and release a volume of air in said transparent tube above said indicator fluid as said level of said indicator fluid changes with said level of said liquid in said tank.

14. The liquid level gauge of claim 13, wherein said first tube is comprised of an inner section detachably connected to an outer section by a connector for facilitating installation in said tank.

15. The liquid level gauge of claim 13, further including food color blended in said indicator fluid for visibility and resistance to fading in direct sunlight.

16. The liquid level gauge of claim 13, further including alcohol blended in said indicator fluid to lower a freezing point of said indicator fluid and help inhibit bacteria growth.

17. The liquid level gauge of claim 13, further including an elongated shroud positioned behind said transparent tube to help prevent said transparent tube from being obscured by any adjacent vegetation.

* * * * *